(12) United States Patent
Ford et al.

(10) Patent No.: US 6,721,657 B2
(45) Date of Patent: Apr. 13, 2004

(54) INERTIAL GPS NAVIGATION SYSTEM

(75) Inventors: Thomas John Ford, Calgary (CA); Janet Brown Neumann, Calgary (CA); Ian Williamson, Calgary (CA)

(73) Assignee: NovAtel, Inc., Calgary (CA)

( * ) Notice: Subject to any disclaimer, the term of this patent is extended or adjusted under 35 U.S.C. 154(b) by 36 days.

(21) Appl. No.: 10/162,287

(22) Filed: Jun. 4, 2002

(65) Prior Publication Data

US 2002/0198656 A1 Dec. 26, 2002

Related U.S. Application Data

(60) Provisional application No. 60/295,613, filed on Jun. 4, 2001.

(51) Int. Cl.[7] .......................... G01C 21/26; G01C 21/30
(52) U.S. Cl. ..................... 701/213; 701/200; 73/178 R; 342/357.01; 342/357.06; 342/357.12; 342/357.14; 340/988
(58) Field of Search ................................. 701/213, 200; 73/178 R; 342/357.01, 357.06, 357.12, 357.14; 340/988

(56) References Cited

U.S. PATENT DOCUMENTS

| | | | |
|---|---|---|---|
| 5,923,286 A | * | 7/1999 | Divakaruni ............ 342/357.06 |
| 6,122,595 A | | 9/2000 | Varley et al. |

FOREIGN PATENT DOCUMENTS

| | | |
|---|---|---|
| WO | WO 01/20260 | 3/2001 |

OTHER PUBLICATIONS

Buchler R J et al: "Design and test of a synergistic interferometric GPS–INS" Position Location and Navigation Symposium, 1996, IEEE 1996 Atlanta, GA, USA 22–26 Apr. 1996, pp. 612–619.

Knight D T: "Rapid Development of Tightly–Coupled GPS/INS Systems", IEEE Aerospace and Electronic System Magazine, Feb. 1997, IEEE Inc., New York, US, vol. 12, No. 2, pp. 14–18.

* cited by examiner

*Primary Examiner*—William A. Cuchlinski, Jr.
*Assistant Examiner*—Olga Hernandez
(74) *Attorney, Agent, or Firm*—Cesari and McKenna, LLP (57) ABSTRACT

A receiver that uses a single processor to control a GPS sub-system and an inertial ("INS") sub-system and, through software integration, shares GPS and INS position and covariance information between the sub-systems. The receiver time tags the INS measurement data using a counter that is slaved to GPS time, and the receiver then uses separate INS and GPS filters to produce GPS and INS position information that is synchronized in time. The GPS/INS receiver utilizes GPS position and associated covariance information in the updating of an INS Kalman filter, which provides updated system error information that is used in propagating inertial position, velocity and attitude. Whenever the receiver is stationary after initial movement, the INS sub-system performs "zero-velocity updates," to more accurately compensate in the Kalman filter for component measurement biases and measurement noise. Further, if the receiver loses GPS satellite signals, the receiver utilizes the inertial position, velocity and covariance information provided by the Kalman filter in the GPS filters, to speed up GPS satellite signal re-acquisition and associated ambiguity resolution operations.

20 Claims, 4 Drawing Sheets

INERTIAL GPS NAVIGATION SYSTEM

CROSS-REFERENCE TO RELATED APPLICATION

The present application claims the benefit of U.S. Provisional Patent Application Ser. No. 60/295,613, which was filed on Jun. 4, 2001, by Tom Ford and Janet Brown Neumann for An Inertial/GPS Navigation System on the OEM4 Receiver and is hereby incorporated by reference.

BACKGROUND OF THE INVENTION

A global positioning system (GPS) receiver requires signals from a number of GPS satellites in order to accurately calculate its position. The GPS receiver acquires and tracks signals consisting of carrier, pseudo random codes and modulated data from various satellites. The receiver correlates locally-generated codes with the codes received from the respective satellites to derive timing information relating the receiver time relative to the local generation of code chips to the satellite time at the times of the transmission of the corresponding code chips. The timing relationship between the receiver time and the transmission times of the various signals at the various satellites can be used in conjunction with the modulated data from the various satellites to generate a position of the receiver with respect to a reference frame shared with the satellites, for example, the earth centered earth fixed (ECEF) frame.

At least 4 satellites are required to provide a GPS position solution. Corrections to pseudo random measurements with respect to a fixed position, which is generated at a "base station" receiver, can be used to derive a relative position of the local receiver with respect to the base station position. Carrier measurements taken at the base station and the local receiver can be mixed in a known manner to generate precise relative position measurements, provided sufficient signals are available either instantaneously or over time to make it possible to resolve associated initial ambiguities of the carrier measurements. The ambiguities represent the differences in geometric distances between the local receiver, the base station receiver and the various satellites that are, at the time, being used for carrier tracking at the two receivers The resolution process typically takes between 30 seconds to a minute, but possibly more if the number of satellites in the constellation is small.

If the GPS receiver does not, at any given time, receive the signals from a minimum number of satellites, the GPS receiver is unable to calculate position information. Thereafter, when the satellite signals are again available to the GPS receiver, that is, the satellites are "visible" to the receiver, the receiver must re-acquire the signals before the receiver can resume its position calculations. Signal re-acquisition involves re-synchronizing locally-generated codes to the codes in the received signals, in order to again track the signals. Following the signal re-acquisition process, the receiver must, when operating in precise differential mode re-resolve the carrier ambiguities before precise positions become available.

During the re-acquisition operations, the user is without navigation information. During the resolution process the user is without precise position information. Accordingly, the speed with which the receiver re-acquires the signals and resolves the carrier ambiguities is of paramount importance to the user.

The GPS satellites may become unavailable to the GPS receiver for various periods of time in, for example, urban environments, when the GPS receiver travels under a bridge, through a tunnel, or through what is referred to in the literature as an "urban canyon," in which buildings block the signals or produce excessively large multipath signals that make the satellite signals detrimental to use for position calculations. In addition, operating the GPS receiver while passing through natural canyons and/or areas in which satellite coverage is sparse, and so forth, may similarly result in the receiver being unable to track a sufficient number of satellites. Thus, in certain environments the navigation information may be available only sporadically, and GPS-based navigation systems may not be appropriate for use as a navigation tool.

One proposed solution to the problem of interrupted navigation information is to use an inertial system to fill-in whenever the GPS receiver cannot observe a sufficient number of satellites. The inertial system, however, has well-known problems, such as accelerometer and gyroscope biases, that tend to introduce drift errors into the inertial position information over time. It has thus been proposed to use the GPS position information to limit the adverse effects of the drift errors on the position calculations in the inertial system. Further, it has been proposed to provide inertial position and velocity information to the GPS system, to aid in signal re-acquisition and in the process to resolve ambiguities. While such systems are discussed as being desirable, we are not aware of any prior GPS receivers that in real time combine the information from GPS and inertial sub-systems both to aid signal re-acquisition and to re-acquire carrier ambiguities, thereby providing accurate and uninterrupted navigation information in an environment in which GPS satellite information is not essentially continuously available.

SUMMARY OF THE INVENTION

The invention is a receiver that uses a single processor to control a GPS sub-system and an inertial ("INS") sub-system and, through software integration, shares GPS and INS position and covariance information between the sub-systems. The receiver time tags the INS measurement data using a counter that is slaved to GPS time, and the receiver then uses separate INS and GPS filters to produce GPS and INS position information that is synchronized in time. The GPS/INS receiver utilizes GPS position and associated covariance information in the updating of an INS Kalman filter, which provides updated system error information that is used in propagating inertial position, velocity and attitude. Further, the receiver utilizes the inertial position, velocity and covariance information in the GPS filters to speed up GPS satellite signal re-acquisition and associated ambiguity resolution operations.

The GPS/INS receiver uses particularly robust inertial processing to produce inertial position and covariance information from which the GPS sub-system can readily calculate theoretical pseudoranges, and Doppler rates that are sufficiently close to the actual values so as to significantly reduce the time it takes the receiver to re-acquire the satellite signals. The signal re-acquisition times are reduced even if the GPS satellites remain unavailable to the receiver for relatively long periods of time and/or the periods of unavailability occur relatively frequently, such as in a typical urban environment.

When the receiver is turned on, the receiver performs GPS signal acquisition and tracking operations in a conventional manner and determines an initial GPS position. As soon as a position becomes available, the receiver also performs a coarse alignment as part of the INS processing. The coarse alignment, which assumes the receiver is stationary, includes a reference frame recognition operation that establishes, for receiver accelerometer and gyroscope measurements, a reference frame with a z-axis pointing away from the gravity vector. The INS processing then estimates the noise level on the INS measurements, and calculates an initial attitude, represented by the Euler angles relating the body i.e., an Inertial Measurement Unit (IMU) frame, to the computational frame, i.e., the Earth Centered Earth Fixed (ECEF) frame. The alignment is computed over time with the use of accelerometer and gyroscope measurements, and the accuracy of the alignment increases as averaging over the alignment time decreases the effect of noise on the measurements. Further, the INS processing calculates an inertial velocity and an inertial position, which is calculated relative to the initial GPS position. The INS processing also initializes an INS Kalman filter using the initial GPS position and related covariance information, and the INS sub-system parameters and other INS sub-system related information.

After coarse alignment, the INS sub-system operates in a navigation mode to process the inertial measurements. The navigation mode begins at the earlier of the time the receiver is put into motion or a predetermined time after the first GPS position information becomes available to the INS sub-system. If the receiver is not in motion at the start of navigation mode, the INS processing performs fine alignment operations, to compensate for the adverse effects of "false observables," such that the INS sub-system can better adapt once the receiver is put in motion. Thereafter, whenever the receiver is again stationary, the INS sub-system performs "zero-velocity updates," (ZUPT) to more accurately compensate in the Kalman filter for component measurement biases and measurement noise. The INS processing operations are discussed in more detail below.

In navigation mode, while the receiver is tracking the signals from an appropriate number of GPS satellites, the receiver provides to the user navigation information that includes GPS position information and, as appropriate, inertial attitude and velocity information. At the same time, the receiver uses the GPS position and associated covariance information to update the INS Kalman filter.

Whenever a sufficient number of satellites are unavailable to the receiver, the receiver uses the INS position in the navigation information. At the same time, the receiver continuously attempts to re-acquire satellite signals. For this task, the GPS sub-system uses the inertial position and velocity information to generate, for the respective satellites, theoretical pseudoranges and associated theoretical Doppler rates that, because of robust INS processing, are close to the actual values. The GPS sub-system then uses the theoretical values to re-set the respective code generators and associated Doppler correction circuits, such that the receiver quickly locks its tracking loops to the respective satellite signals. Further, the GPS sub-system uses the inertial position and covariance information to aid in quickly resolving associated carrier cycle ambiguities. The receiver can thus relatively quickly resume using the GPS position in the navigation information. The signal re-acquisition and ambiguity re-resolution operations are discussed in more detail below.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
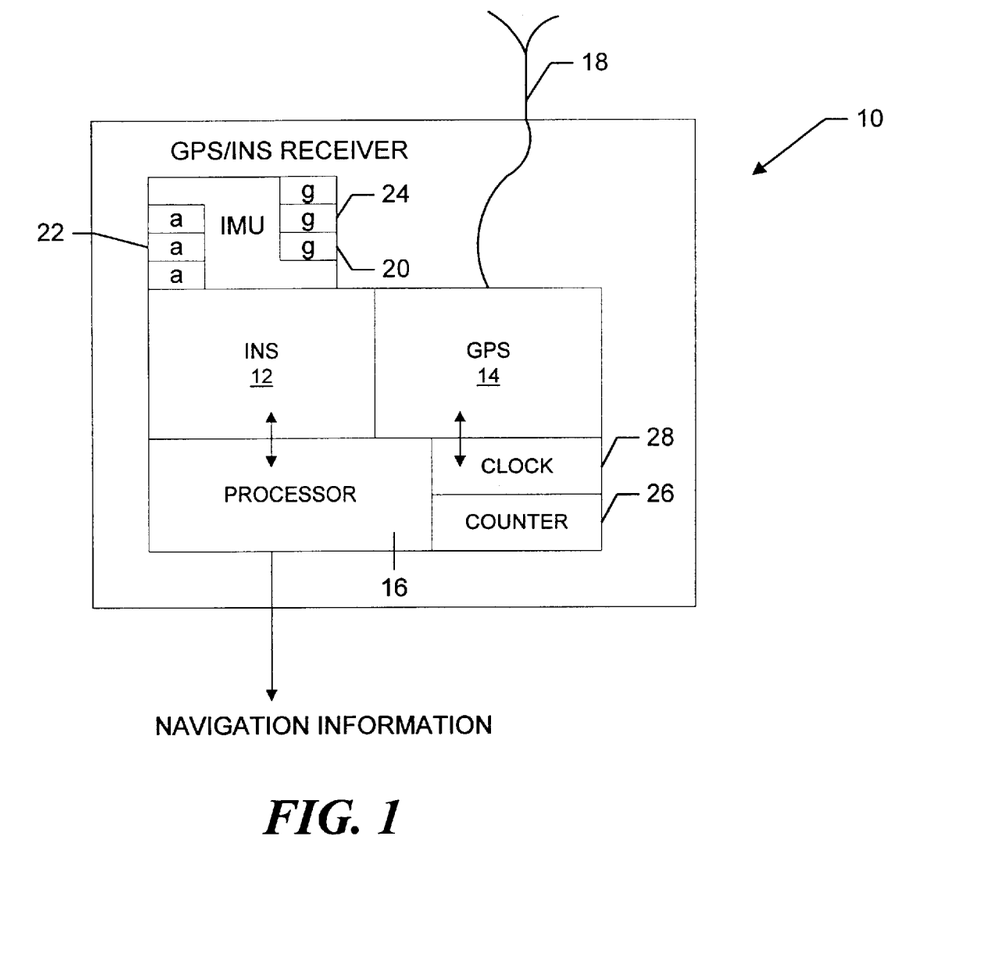
FIG. 1 is a functional block diagram of a GPS/INS receiver constructed in accordance with the invention.

Referring now to FIG. 1, a GPS/INS receiver 10 includes an INS sub-system 12 and a GPS sub-system 14 that operate under the control of a processor 16, to calculate GPS position and INS position, velocity and attitude information. The GPS subsystem processes the satellites signals received over an antenna 18. The INS subsystem receives measurements from an inertial measuring unit ("IMU") 20 that reads data from orthogonally positioned accelerometers 22 and gyroscopes 24. The data from the IMU is time tagged by a counter 26 that is slaved to a GPS-time clock 28, as discussed in more detail below. The two sub-systems can thus reliably interchange position-related information that is synchronized in time. The two subsystems operate together, through software integration in the processor 16, to provide position-related information between the subsystems as predetermined times and/or in response to particular events. The receiver provides navigation information, such as position, velocity and/or attitude, to the user through, for example, an attached display device (not shown).

For ease of understanding, we discuss the processing operations of the two sub-systems without specific reference to the processor 16. The system may instead include dedicated GPS and INS sub-processors that communicate with one another at appropriate times to exchange information that is required to perform the various GPS and INS calculation operations discussed below. For example, the INS sub-processor communicates with the GPS processor when IMU data is provided to the sub-processor, in order to time-tag the data with GPS time. Further, the GPS sub-processor communicates with the INS sub-processor to provide GPS position information at the start of each measurement interval, and so forth.

At start-up, the GPS sub-system 14 operates in a known manner to acquire the signals from at least a minimum number of GPS satellites and calculate pseudoranges to the respective satellites and associated Doppler rates. Based on the pseudoranges, the GPS sub-system determines its position relative to the satellites. The GPS sub-system may also determine its position relative to a fixed-position base receiver (not shown), either through the use of differential correction measurements generated at the base station or after resolving associated carrier cycle ambiguities.

Figure 4:
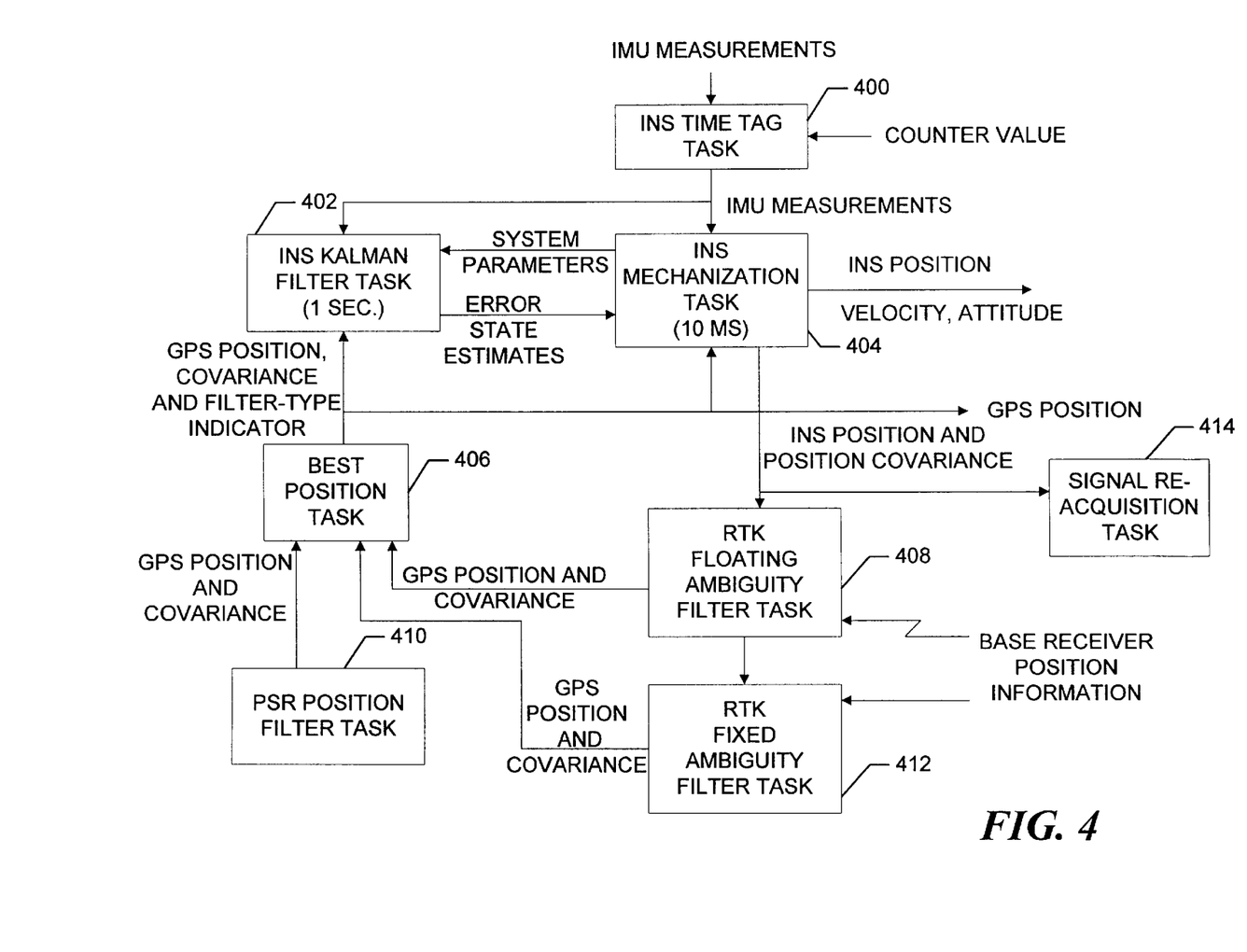
FIG. 4 is a functional block diagram of a GPS/INS receiver that incorporates a NovAtel OEM4 GPS receiver.

At the same time, the INS sub-system 12 processes the IMU data, that is, the measurements from the various accelerometers 22 and gyroscopes 24, to determine the initial attitude and velocity of the receiver. The INS sub-system further processes both the IMU data and the GPS position and associated covariance information to set up various matrices for an INS Kalman filter (FIG. 4). At the start of each measurement interval, the INS sub-system updates the Kalman filter and provides updated error states to a mechanization process. The mechanization process uses the updated information and the IMU data to propagate, over the measurement interval, the inertial position, attitude and velocity, with the inertial position and other system element errors being controlled with GPS positions at the start of the measurement interval.

Figure 2:
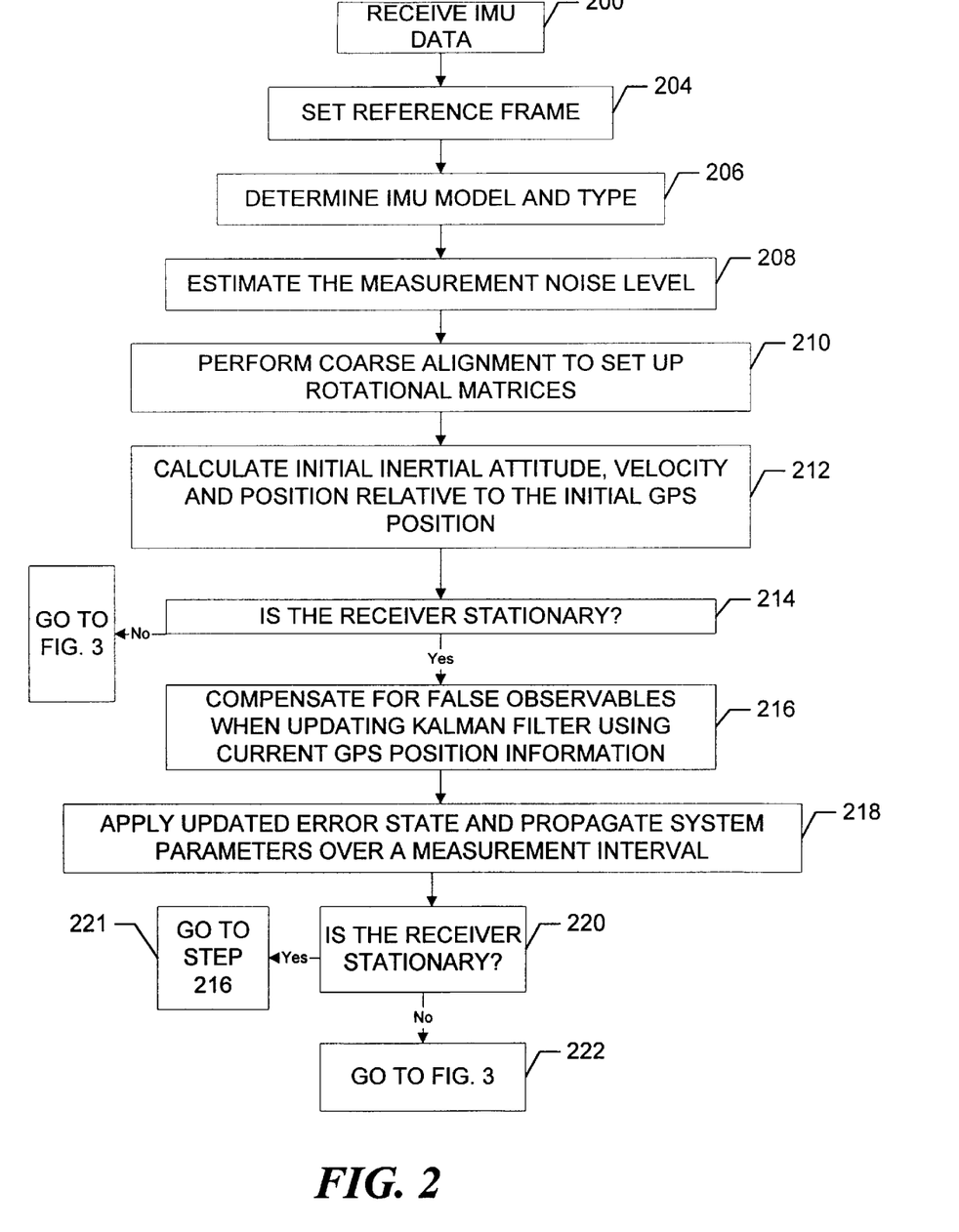
FIG. 2 is a flow chart of the INS start-up processing.

Referring now also to FIG. 2, at start-up the receiver 10 is presumed to be at rest, and the INS sub-system 12 determines the orientation of a reference, or body, frame for the accelerometer and gyroscope measurements (step 202). The INS sub-system calculates the initial attitude represented as Euler angles relating the body frame to the ECET frame. Accordingly, the y-axis of the measurement reference frame must not be aligned with the gravity vector.

To set the orientation of the reference frame such that the y-axis does not align with the gravity vector, the INS sub-system 12 compares the measurements from the various accelerometers, which are nominally assigned to x, y and z axes, to determine which measurement largest in magnitude. The INS sub-system then re-assigns or maps the x, y and z axes among the accelerometers such that the z-axis has the largest positive acceleration magnitude, that is, such that the z-axis points up. The INS sub-system will then properly estimate the initial attitude, regardless of how the receiver is oriented.

The IMU 20 plugs into a port (not shown) of the processor 16 and through the port supplies accelerometer and gyroscope measurement data to the processor. The IMU may be selected from a number of models and/or types, each associated with a different scaling factor and nominal accelerometer and gyroscope bias levels. The user may select a particular IMU model for navigation operations based on price and/or on the particular characteristics of the IMU.

At start-up, the INS sub-system must thus determine which IMU is connected to the processor 16 (step 204), in order to ensure that the IMU measurements are scaled correctly, and also to assign initial uncertainties to the attitude calculations. The INS sub-system tests for a particular IMU by determining the scale factor associated with the accelerator measurements. The process thus compares a ratio of the magnitude of the normal gravity vector and the length of the scaled acceleration vector with stored ratios associated with the various IMU scale factors and selects the appropriate model/type.

If the IMU is not interchangeable in the receiver, the model-selection operations of step 204 may be omitted from the start-up operations.

At essentially the same time, the INS sub-system estimates the noise level on the IMU measurements (step 206) based on the standard deviation of the measured accelerometer signals. If the receiver moves before the noise level estimation is completed, the process uses as the estimate the nominal noise level value specified by the IMU manufacturer.

The steps 202, 204 and 206 occur essentially simultaneously. Once the reference frame, noise level and, as appropriate, and the IMU model/type are determined, the INS sub-system 12 begins a coarse alignment process (step 208). The coarse alignment process sets up various rotational matrices that are used to transform measurement data to a computational frame, which in the example is the earth centered earth fixed frame or ECEF frame. The coarse alignment process is based on an assumed "local" position of the receiver, which is the initial GPS position provided by the GPS sub-system 14. The INS subsystem specifies three orthogonal vectors that are associated with the local position, namely, the gravity vector, the earth angular velocity vector, and the cross product of the two vectors. The INS sub-system then determines the same vectors and their cross product transformed to the reference, or body, frame, based on the measurements of the accelerometers 22 and gyroscopes 24. The two sets of three vectors form two matrices $S^l$ and $S^b$ which are related by the transformation:

$$S^b = R_l^b S^l \text{ or } (S^b)^T = (S^l)^T R_b^l$$

where $R_l^b$ is the rotation matrix used to transform a vector from the local level to the reference, or body, frame, and $R_b^l$ is the transpose of the rotation matrix:

$$R_b^l = ((S^l)^T)^{-1} (S^b)^T$$

Once $R_b^l$ is computed, the INS sub-system calculates a rotation matrix $R_b^e$, which is used to rotate the body frame measurements to the computational (ECEF) frame:

$$R_b^e = R_b^l R_l^e$$

the system further uses specific elements of the matrix $R_b^l$ to generate roll, pitch and azimuth state elements:

Roll=ArcSin($R_{3,2}$)=ArcSin($-f_y/g$)

Pitch=ArcTan($-R_{3,1}$, $R_{3,3}$)=ArcTan($f_x/g$, $-f_z/g$)

Azimuth=ArcTan(($f_x\omega_z - f_z\omega_x$)/(WgCos($\phi$)), (Wf$_y$Sin($\phi$)+ $\omega_y$g)/(WgCos($\phi$)))

where $f_x$, $f_y$, $f_z$ are specific forces measured in the body frame by the IMU, $\omega_x$, $\omega_y$, $\omega_z$ are angular rates measured in the body frame by the IMU, W is the earth rotation rate, g is the magnitude of normal gravity, and $\phi$ is latitude.

The alignment accuracy over time is dependent on the noise on the gyroscope measurements and in particular on the noise on $\omega_x$ when the reference frame is aligned such that $\omega_x$ points east. Accordingly, the INS sub-system 12 uses the estimated noise level determined in step 206 in calculating the initial attitude and velocity. The INS sub-system also calculates an inertial position relative to the initial GPS position (step 210).

During coarse alignment, the INS sub-system also determines coning and sculling compensation values in a conventional manner and applies these to accumulated delta velocities and delta angles.

Coarse alignment ends after the earlier of a fixed length of time after the calculation of an initial GPS position or the system begins to move. As part of the coarse alignment, the attitude accuracy and INS measurement noise level is computed. After coarse alignment, the INS sub-system operates in navigation mode to propagate the inertial system parameters of position, velocity, attitude and bias estimates. The propagation involves a Kalman filter process and a mechanization process. The Kalman filter process essentially updates system error and variance covariance information and propagates the variance covariance information, and the mechanization process uses the updated information in the propagation of the inertial system parameters of position, velocity, attitude.

A generic Kalman filter process estimates a series of parameters that describe and predict the behavior of a system. The Kalman filter operates with a set of state variables that describe errors in the system and an associated variance covariance matrix that describes the current knowledge level of the state. The Kalman filter maintains an optimal estimate of the system errors and associated covariance over time and in the presence of external measurements through the use of propagation and updating processes. The Kalman filter propagates a state vector x and an inertial state variance covariance matrix P as:

State:$x(-) = \Phi x(+)$

Covariance:$P(-) = \Phi P(+) \Phi^T + Q$ where, for example, x(+) represents the state vector after update and x(−) represents the state vector after propagation, $\Phi$ is the state transition matrix which is a time solution to a dynamics matrix F (discussed below with reference to the INS Kalman filter), and Q is a matrix that represents the time propagation of the spectral densities of the state elements. To propagate the state and its covariance from some past time to the current time, the Kalman filter propagation step uses knowledge of the state dynamic behavior determined from the physics of the system and the stochastic characteristics of the system over time. The Kalman filter update step is:

$$K=P(-)H^T(HP(-)H^T+R)^{-1}$$

$$x(+)=x(-)+K(z-Hx(-))$$

$$P(+)=(I-KH)P(-)$$

where z is the observation vector, R is the observation variance covariance matrix, H is a matrix that represents the linear relationship between the observation and the state vectors, and K is the Kalman gain matrix.

The Kalman filter update step thus uses the linear relationship between the state and observation vectors in conjunction with the covariance matrices related to those vectors to determine corrections to both the state vector and the state covariance matrix.

The INS Kalman filter relates observational data, i.e., IMU data and GPS data, to various elements in the state based on a functional relationship that is modeled as a linear relationship. The state vector is initially set to the zero vector because any error estimates are initially applied to the system parameters of position, velocity, attitude, and also to bias terms, as discussed below.

The values initially assigned to the elements of the P matrix are based on the best knowledge available about the system after alignment. The values are related to the system parameters, the quality of the alignment, the estimated measurement noise level, and the type of GPS position information available initially, i.e., the uncertainties associated with the GPS filter used to produce the position information, as discussed in more detail below with reference to FIG. 4. The Q matrix elements are generated from formulas that incorporate the IMU device specifications. The relevant system parameters used to generate the elements of Q are the accelerometer and gyroscope scale factor accuracy and linearity, the velocity random walk, the angular random walk, and the accelerometer and gyroscope measurement noise.

The state vector x has 18 elements—3 each for position, velocity, attitude, gyroscope biases, accelerometer biases and IMU to GPS antenna offsets. The position, velocity and attitude states model errors in the computational (ECEF) frame and the bias and offset states model errors in the body frame. The position, velocity, attitude and offset states are modeled as random walks, while the accelerometer and gyroscope bias states are modeled as Gauss-Markov processes.

The dynamics matrix for the 18-state system is:

$$F = \begin{bmatrix} 0 & I & 0 & 0 & 0 & 0 \\ N & 2\Omega_{ie}^e & F & 0 & R_b^e & R_b^e\Omega_{eb}^b \\ 0 & 0 & \Omega_{ie}^e & R_b^e & 0 & 0 \\ 0 & 0 & 0 & -\beta_g & 0 & 0 \\ 0 & 0 & 0 & 0 & -\beta_a & 0 \\ 0 & 0 & 0 & 0 & 0 & 0 \end{bmatrix}$$

The $R_b^e\Omega_{eb}^b$ term is required for the differential equation $$\delta\dot{v}^e = \dot{R}_b^e \delta O^b = R_b^e \Omega_{eb}^b \delta O^b$$

which links the velocity error rate to errors in the body frame offset between the IMU and the GPS antenna. The N term, which links errors in velocity error rate to errors in position, is the matrix tensor of the derivatives of the normal gravity vector parameterized in the ECEF frame with respect to position, evaluated at the current position of the receiver. The F term is a skew symmetric sub-matrix of specific force elements parameterized in the computational (ECEF) frame. The elements of F are generated from the raw delta velocity measurements (transformed to the ECEF frame) accumulated over ½ second time intervals, which is the delta time used for the state covariance propagation, as discussed below. The $\beta_g$ and $\beta_a$ terms are time constants of the Gauss-Markov processes which model the gyroscope and accelerometer bias states, respectively. These terms are derived from the accelerometer and gyroscope random walk characteristics, which are specified by the IMU manufacturer.

The $R_b^e$ term is the rotation matrix that transforms vectors in the body frame to the ECEF frame. The rotation matrix transforms gyroscope bias errors to the ECEF frame and applies them directly to the attitude error rates and similarly transforms the accelerometer bias errors to the ECEF frame and applies them directly to the velocity error rates. Specifically, the transformation $$d\delta v/dt_e = R_b^e d_a^b$$

relates the velocity error rate in the ECEF frame to accelerometer biases in the body frame, and the transformation $$d\epsilon/dt_e = R_b^e d_g^b$$

relates the attitude error rate in the ECEF frame to gyroscope biases in the body frame.

The state information is fed back into the mechanization process after every update. The updated state is then set to the zero vector, and there is no propagation of the state in the INS Kalman filter propagation step. The INS Kalman propagation step is thus simplified computationally by propagating only the variance covariance matrix:

$$P(-)=\Phi P(+)\Phi^T+Q$$

The propagation step is performed once per ½ second, and thus, twice per 1 second measurement interval, to avoid degradation problems in high dynamic environments. A ½ second propagation makes the assumption of constant coefficients in the dynamics matrix a reasonable one. Further, the ½ second propagation allows for a first order solution of that matrix system of differential equations, with $\Phi=I+\Delta tF$ a reasonable approximation. The INS Kalman filter propagation step computations can be further simplified by using only the non-zero elements of the transition matrix $\Phi$ in pre- and post-P multiplication steps.

As discussed above, the level of noise on the IMU measurements is a source of error, and it must thus be taken into account in the INS Kalman filter. The velocity and attitude states are modeled as random walks and the basic process noise values applied to these is a function of the noise levels on the accelerometers and gyroscope measurements, respectively. But accelerometer and gyroscope scaling errors are not modeled as states in the system, and so they also will contribute to the uncertainty of the velocity and attitude states in the presence of acceleration and system rotation.

In the case of the accelerometers it is not possible to distinguish the scaling and bias errors while the system is stationary. Therefore, in the presence of gravity, the vertical axis accelerometer bias becomes observable but part of the bias error is the result of the associated scaling error. Accordingly during initialization, the system retains the average specific forces measured while the first estimates of the accelerometer biases are made. Later, when the system starts to move, the specific forces measured by the accelerometers are differenced from the initial specific forces and these differences are used in the propagating of the P matrix. Specifically, at each INS Kalman filter propagation step the following is applied to the velocity state elements of the P matrix:

$$Q_v = \Delta t \sigma_{sa}^2 R_b^e F_\Delta F_\Delta^T R_e^b$$

where $F_\Delta$ is the diagonal matrix of specific force differences and $\sigma_{sa}^2$ is based on a combination of the accelerometer accuracy and linearity terms supplied by the IMU manufacturer.

The gyroscope scaling errors affect the attitude states in a similar manner, based on the missing state propagation of gyroscope scale factor uncertainty to attitude uncertainty. Accordingly, at each INS Kalman filter propagation step the following is applied to the attitude state elements of the P matrix:

$$Q_a = \Delta t \sigma_{sg}^2 R_b^e \Omega_{eb}^b {}_\Delta \Omega_{be}^b R_e^b$$

where $\sigma_{sg}^2$ is based on a combination of the gyroscope accuracy and linearity terms supplied by the manufacturer, and $\Omega_{eb}^b$ is the skew symmetric matrix of the instantaneous rotation of the ECEF frame with respect to the body frame parameterized in the body frame.

If the receiver is stationary at the start of the navigation mode, the INS sub-system performs a process to reduce the effect noise-induced "false observables" (steps 214, 216). Due to accelerometer and gyroscope biases and noise on the measurements, the INS sub-system measurements indicate that the receiver is moving.

There is a link between the velocity error rates and errors in the attitude state through the F sub-matrix. Thus, without compensating for the associated false observable, the accuracy of the attitude estimate is essentially limited by the uncertainties in the biases, which results in the attitude variance estimate being smaller than, in theory, it should be, and also a decrease in the azimuth standard deviation. To compensate, the INS sub-system averages the specific force observations used to produce the elements of the F sub-matrix.

A second false observable relates to the H matrix and specifically to a component of $R_b^e$ that rotates the estimated IMU to GPS antenna offset from the reference frame to the computation frame (ECEF). During convergence, and depending on the quality of the coarse alignment, the azimuth component of the $R_b^e$ matrix can vary by as much as 50 degrees. This causes the gain elements which are related to the offset states that are normally unobservable when the receiver is stationary to become non-zero. The result is a reduction in the variance of the offset elements in the P matrix, such that the offset vector is slow to converge and it often converges to the wrong value once the receiver starts to move. Accordingly, to compensate the INS sub-system uses the initially-defined $R_b^e$ matrix while the receiver remains stationary, which ensures that the theoretically unobservable portions of the offset states remain unobservable until the receiver starts to move. When the receiver moves, the associated rotation is reflected in the P matrix off-diagonal terms, which correctly allow the offset state elements to become observable.

To speed Kalman filter update operations, the INS subsystem may omit the IMU to GPS antenna offset information from the state vector. Accordingly, the processing associated with second false observable is then omitted from the real-time processing operations.

Figure 3:
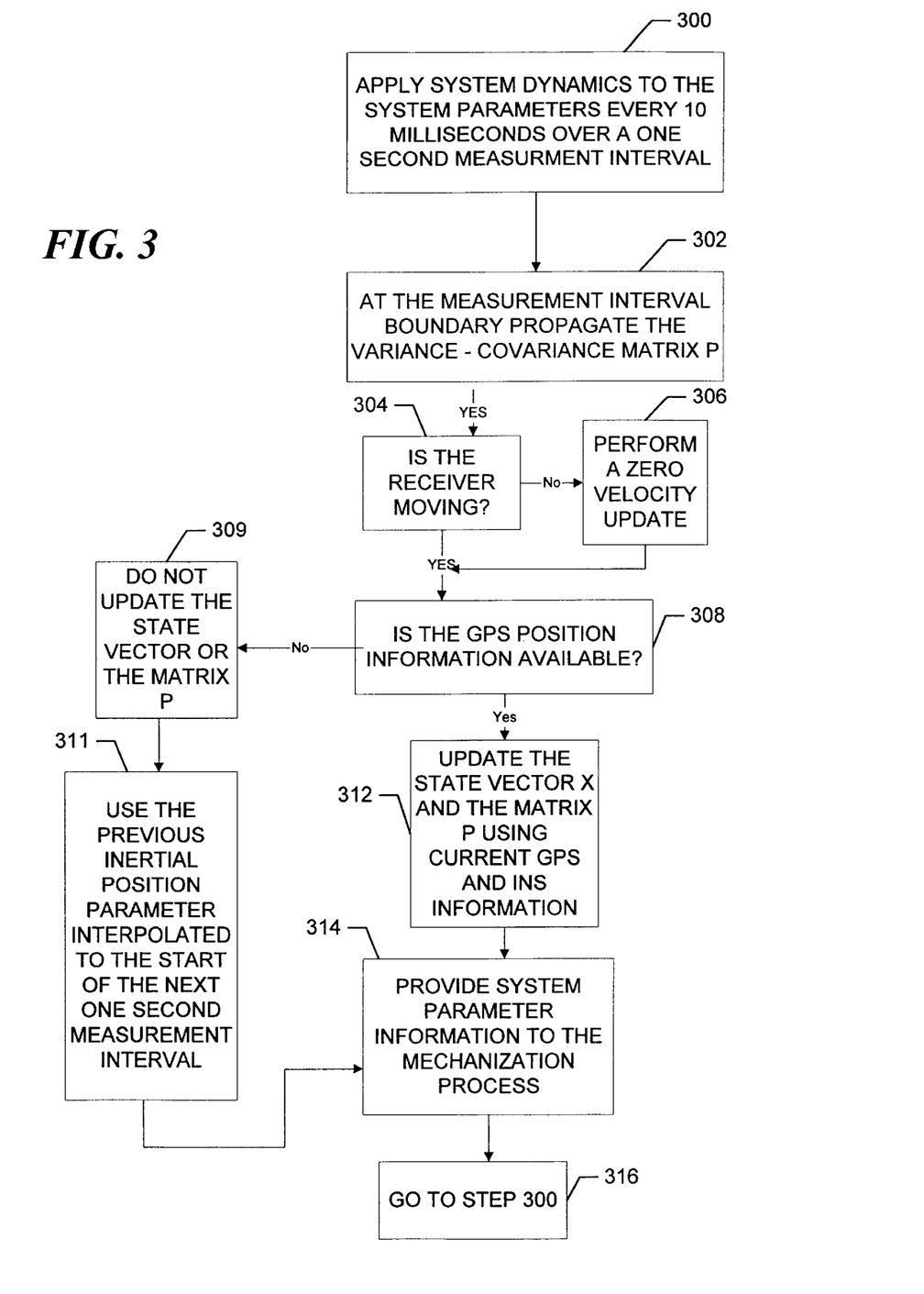
FIG. 3 is a flow chart of INS steady-state processing.

Referring now to FIG. 3, once the receiver starts to move, the INS sub-system 12 operates in steady-state navigation mode. In step 300, the inertial position, velocity and altitude are propagated over a one second measurement interval with the receiver dynamics applied every ten milliseconds, as discussed with more detail below. At the one second mark, the INS Kalman filter propagates the covariance matrix P. The INS sub-system then determines its inertial position at the one second boundary, interpolating as necessary. At the same time the INS sub-system determines if the receiver is moving, and if not the receiver performs a "zero-velocity update" or ZUPTS, as discussed below. Otherwise, the INS system waits for the GPS position corresponding to the 1 second mark, assuming the receiver has a sufficient number of the GPS satellites then available to it. Once the GPS position information is supplied by the GPS sub-system, the INS Kalman filter process performs a position update using the INS measurements and system parameters. Otherwise, the Kalman filter does not perform a position update. Thereafter, the Kalman filter provides the error state information, updates as appropriate, to the mechanization process which again applies the system dynamics to the system parameters.

For position updates the H matrix is:

$$H = [I, 0, 0, 0, 0, R_b^e]$$

and for velocity updates the H matrix is:

$$H = [0, I, 0, 0, 0, 0].$$

For a ZUPT to occur, the difference between the magnitudes of an averaged measured acceleration vector and the gravity vector has to be within a predetermined threshold range, and also the magnitude of an averaged measured angular rate vector has to be below a predetermined threshold. The velocity update to the Kalman filter for a ZUPT uses an observation covariance matrix that is based on the thresholds used to detect the stationary condition. At the same time the Kalman filter uses GPS position to update the state, but since the system is stationary, the GPS position is de-weighted nine out of ten times unless the position is based on fixed integer ambiguities. This deweighting prevents an inordinate reduction of the state variances as a result of the correlated measurement noise that occurs on the GPS measurements when the system is stationary.

As discussed, if the GPS position information is not available and the receiver is moving, the INS Kalman filter does not perform an update. The propagated covariance matrix then reflects that no GPS position is available. The interpolated inertial position is used as the receiver position at the start of the next one second measurement cycle (step 309).

If the GPS position information is not available and the receiver is moving, the INS Kalman filter does not perform an update (step 307). The propagated covariance matrix then reflects that no GPS position is available. The interpolated inertial position is used as the receiver position at the start of the next one second measurement cycle (step 309). If, however, the receiver is stationary, the INS Kalman filter performs a ZUPT but no position update, (step 311) and again uses the interpolated inertial position as the receiver position, (step 309).

As discussed below, the Kalman filter process may de-weight certain observation covariance information associated with certain observation times when, for example, particular GPS filters are used to determine GPS position, whether or not the receiver is stationary. The de-weighting is similarly used to compensate for time correlated measurement noise.

In many environments, for example, urban canyons, the receiver may experience severe multipath errors. To prevent the GPS positions generated in these environments from corrupting the inertial system parameters via the Kalman filter update, the INS sub-system places a six sigma bound on the information before the information is used to update the Kalman filter.

The mechanization process (step 306) combines the initial conditions determined during course alignment with the IMU data, to keep the INS sub-system parameters current. Thereafter, the mechanization process uses the conditions associated with the ending boundary of the previous measurement interval, and propagates the INS sub-system parameters, that is, position, velocity and attitude, from the end boundary of the previous measurement interval to the end boundary of the current measurement interval.

The mechanization process uses the measured delta velocities and delta angles in the solution of the fundamental differential equations:

$$dR_b^e/dt = R_b^e(\Omega_{ei}^b + \Omega_{ib}^b)$$

and $$d^2r^e/dt^2 = R_b^e f^b + g^e - 2\Omega_{ie}^e dr^e/dt$$

The first differential equation maintains the attitude relationship between the reference, or body, frame and the computational frame (in this implementation ECEF). The attitude is maintained as a quaternion, which is somewhat more efficient than a 9 element direction cosine solution. As a consequence, the transformation matrix $R_b^e$ is recomputed every sampling time from the quaternion elements:

$$R_b^e = \begin{bmatrix} r_{11} & r_{12} & r_{13} \\ r_{21} & r_{22} & r_{23} \\ r_{31} & r_{32} & r_{33} \end{bmatrix}$$

$$= \begin{bmatrix} q_1^2 - q_2^2 - q_3^2 + q_4^2 & 2(q_1q_2 - q_3q_4) & 2(q_1q_3 + q_2q_4) \\ 2(q_1q_2 + q_3q_4) & q_2^2 - q_1^2 - q_3^2 + q_4^2 & 2(q_2q_3 + q_1q_4) \\ 2(q_1q_3 + q_2q_4) & 2(q_2q_3 + q_1q_4) & q_3^2 - q_1^2 - q_3^2 + q_4^2 \end{bmatrix}$$

The second differential equation maintains the relative position and velocity of the receiver. The $2^{nd}$ order equation can be used to generate two first order equations by introducing a vector ve to represent velocity in the computational (ECEF) frame:

$$dr^e/dt = v^e$$

$$dv^e/dt = R_b^e f^b + g^e - 2\Omega_{ie}^e dr^e/dt$$

In the equation for $dv^e/dt$, the effects of gravity and the Coriolis force may be removed from the measured specific forces transformed to the computational (ECEF) frame by substituting $$f^e = R_b^e f^b.$$

The mechanization process applies receiver dynamics to the INS sub-system parameters once every 10 milliseconds.

The inertial position is determined relative to the GPS position at the beginning of each GPS second. As GPS positions become available at the even GPS second, the Kalman filter process provides updated error states to the mechanization process, and the mechanization process uses the information in the calculations to propagate the system parameters over the measurement interval. The updated information serves to control the inertial system error growth.

Referring now to FIG. 4 we describe the operations of the GPS/INS receiver by way of an example that consists of an IMU and a NovAtel OEM4 dual frequency GPS receiver with software that has been modified such that the GPS processor can process the GPS and inertial measurements using respective GPS and INS filters. The OEM4 can provide L1 and L2 range and carrier measurements, as well as single point, pseudorange differential and carrier-based differential GPS positioning. The GPS sub-system thus includes three GPS filters, namely, a PSR position filter 410 which is a pseudorange least squares position estimator that can operate in either single point or differential mode, a pseudorange/carrier RTK floating ambiguity filter 408 and a carrier-based RTK fixed ambiguity filter 412. A fourth filter, that provides low latency positions computed from the current local carrier measurements, predicted base station measurements and the best available ambiguities, is also part of the system, but is not material to the INS/GPS integration, so is mentioned here only in passing. The respective filters have different error characteristics, and are thus associated with different covariance matrices.

The position and covariance information from each GPS filter are provided to a best-position task 406, which selects a best position based on a minimum covariance trace. The process provides the selected position and associated covariance information and a filter-type indicator to the INS Kalman filter task 402. The GPS position information is also included in the navigation information that is provided to the user.

As discussed above, the Kalman filter task 402 de-weights a proportion of the covariance matrices provided by the GPS sub-system when the system is stationary and/or when particular GPS filters are used to determine the GPS position. Specifically, the Kalman filter process de-weights the covariance matrix 9 out of 10 GPS observation times when the receiver is stationary and the GPS position was generated in the pseudo-range (PSR) position filter 410 or, whether the system is stationary or not, and the position was generated in the floating ambiguity filter 408. Otherwise, the Kalman filter process uses the GPS covariance matrix directly for the updating.

For the INS processing the measurements from the IMU are provided to an IMU task 400 that sends a high priority interrupt to the controller (not shown) on the processor 16 (FIG. 1), and the controller responds by reading the count of a counter 26 that is slaved to GPS time. The counter is accurate to 1 microsecond, while the GPS time is accurate to 100 nanoseconds. The controller uses the count to reconstruct GPS time, and the IMU task time tags the inertial measurements with the reconstructed GPS time. The inertial position based on the data is thus time synchronized to a GPS position at the microsecond level.

As discussed above, a mechanization task 404 processes the IMU data to propagate inertial position, attitude and velocity every 10 milliseconds in accordance with the receiver dynamics. At the 1 second boundaries, the inertial position and velocity with their associated covariance information, which are interpolated to the one second boundary, are sent by the mechanization process to the INS Kalman 402, a signal re-acquisition task 414 and the GPS RTK floating point ambiguity filter 408. The INS Kalman filter uses this information in addition to GPS position and covariance collected at the same time for updating. The GPS filter 408 uses the information to perform integrity checks or, as appropriate, to aid in ambiguity resolution operations, and the signal re-acquisition task uses the information, as appropriate, to aid in signal re-acquisition tasks.

At the measurement interval boundaries, the Kalman filter task 402 provides error states updated or not as discussed above, to the mechanization task 404. The mechanization task includes the error state information in its propagation calculations for that measurement interval. The mechanization task also provides various propagated system parameters to the user as part of the navigation information, as discussed above.

At times when a sufficient number of satellites are not available to the receiver, the receiver omits the GPS position in the navigation information. At the same time, the GPS sub-system uses the inertial position, velocity and covariance information to re-acquire the satellite signals.

The signal re-acquisition task 414 requires the instantaneous code and Doppler rate of a given satellite signal as seen by the receiver in order to synchronize a local code generator to the code in the satellite signal. To determine the instantaneous code, the signal re-acquisition task uses the inertial position, in conjunction with the receiver clock offset and the known satellite position, to generate the theoretical pseudorange to the satellite. The GPS sub-system then re-sets the local code generator to an appropriate code chip based on the theoretical pseudorange.

To determine theoretical Doppler rate, the signal re-acquisition task projects the inertial velocity onto the satellite line of sight vector and uses the resulting line of sight velocity in conjunction with the receiver clock offset and satellite motion to calculate the theoretical Doppler rate for the satellite. The theoretical Doppler rate is then used in the GPS sub-system to set the Doppler controls for the local code generator.

The GPS sub-system calculates the theoretical pseudoranges and Doppler rates for each observable satellite, in turn. Assuming the inertial position and velocity are close to the actual receiver position and velocity, the local code generator produces a code that is close in phase to the corresponding code in the received satellite signal. Thus, as soon as each satellite is available, the GPS sub-system can quickly produce the correlation measurements that are used to determine GPS position.

The GPS sub-system must also resolve cycle ambiguities in order to determine the GPS position relative to the fixed-position receiver. The GPS sub-system first estimates the floating ambiguities associated with the RTK floating ambiguity filter 408. When the position is accurate as represented by the associated covariance, the GPS sub-system initializes a search space for the RTK fixed ambiguity filter 412, and the fixed ambiguity resolution process can begin.

During the ambiguity estimation process, the GPS sub-system uses the inertial position and associated covariance matrix to set the floating ambiguity position and covariance. The floating ambiguity estimation process normally takes up to 20 or 30 seconds to initialize a search space for the integer ambiguity filter, but the inertial aiding allows the initialization of the fixed ambiguity filter to start as soon as signals become available, thus shortening the resolution process considerably.

In testing, we determined that the signal re-acquisition times associated with the GPS/INS receiver described above are significantly improved over the times associated with a GPS-alone receiver, as discussed in the provisional application from which this application claims priority. While a reduction in time to re-acquire is noted without using the ZUPTs, the time saving is even greater when the receiver utilizes the ZUPTs.

As discussed, the GPS/INS uses separate but coupled GPS and INS filters. Using separate GPS and INS filters limits the size and complexities of the filters. Further, the separate calculation of GPS positions and the de-weighting of certain measurements reduces the adverse effects of time-correlated errors in the GPS information that is used to update the INS Kalman filter. Accordingly, the use of separate filters offers several advantages over using one filter. The benefits of the GPS/INS receiver are also discussed in a provisional application from which this application claims priority and in a paper entitled "OEM4 Inertial: A Tightly Integrated Decentralized Inertial/GPS Navigation System," by T. Ford, J. Neumann, P. Fenton, M. Bobye and J. Hamilton, that was presented at the 14th International Technical Meeting of the Satellite Division of the Institute of Navigation in Salt Lake City, September 2001, and is incorporated herein in its entirety by reference.

What is claimed is:

1. An inertial/global positioning system (GPS) receiver including:
   A. a GPS sub-system for providing correlation measurements associated with signals received from a plurality of GPS satellites;
   B. an inertial sub-system for providing inertial measurements from a plurality of accelerometers and gyroscopes;
   C. a counter slaved to GPS time;
   D. a processor for calculating GPS position based on the correlation measurements and inertial position, velocity and attitude relative to the GPS position based on the inertial measurements, the processor using
      GPS position and associated covariance information to control the adverse effects in the inertial calculations of inaccuracies in the inertial sub-system measurements,
      inertial position, velocity and associated covariance information to assist in signal re-acquisition operations of the GPS sub-system; and
      the count of the counter for time tagging the inertial measurements with GPS time to time synchronize inertial and GPS calculated positions.

2. The inertial/global positioning system receiver of claim 1 wherein the processor further
   calculates GPS position relative to a base receiver with a known position, and
   uses inertial position and associated covariance information to assist in carrier cycle ambiguity resolution operations that are part of the signal re-acquisition operations.

3. The inertial/global positioning system receiver of claims 2 wherein the processor
   processes the GPS correlation measurements using one or more GPS filters, and
   processes the inertial measurements using an inertial Kalman filter.

4. The inertial/global positioning system receiver of claim 3 wherein the processor further
   uses the inertial Kalman filter to update system error parameters that are used in the calculations of inertial position, velocity and attitude, calculates an estimated noise level associated with the inertial measurements, and uses the estimated noise level in the Kalman filter processing and to calculate an initial inertial attitude accuracy estimation.

5. The inertial/global positioning system receiver of claims 4 wherein the processor further determines when the receiver is stationary after initial movement, and when the receiver is stationary performs a zero velocity update of the Kalman filter using predetermined velocity values instead of velocity observational values.

6. The inertial/global positioning system receiver of claim 5 wherein the processor uses as the predetermined velocity values the threshold values that are used to determine if the receiver is stationary.

7. The inertial/global positioning system receiver of claim 6 wherein the processor further performs inertial sub-system start-up routines to initialize the Kalman filter and determine the initial attitude, velocity and position relative to an initial GPS position, determines if the receiver remains stationary after the completion of the start-up routines and if the receiver is stationary performs updates to the Kalman filter using average specific force values.

8. The inertial/global positioning system receiver of claim 6 wherein the processor further uses an initial rotation matrix to update the Kalman filter if the receiver remains stationary after the completion of the start-up routines.

9. The inertial/global positioning system receiver of claims 8 wherein the processor further performs as part of the start-up routines a frame recognition operation in which the processor sets a reference frame for the receiver in which the y axis of the reference frame is not aligned with the gravity vector.

10. The inertial/global positioning system receiver of claim 9 wherein the processor performs the frame recognition operation by setting nominal x, y and z axes for the receiver, and assigning the z-axis to the accelerometer that has an acceleration measurement that is largest in magnitude.

11. The inertial/global positioning system receiver of claim 10 wherein the processor includes in the Kalman filter bias terms associated with estimated measurement biases of the accelerometers and gyroscopes.

12. The inertial/global positioning system receiver of claim 2 wherein the processor during signal re-acquisition operations sets the ambiguity and associated covariance of a GPS floating ambiguity filter to the inertial position and associated covariance.

13. The inertial/global positioning system receiver of claim 2 wherein the processor during signal re-acquisition operations uses the inertial position and the associated covariance to set the ambiguity and associated covariance of a GPS floating ambiguity filter.

14. A method of operating an inertial/global positioning system (GPS) receiver to provide uninterrupted navigation information, the method including the steps of:

A. determining a GPS position and a GPS time-tagged inertial position relative to the GPS position;

B. using the GPS position in the navigation information when a sufficient number of GPS satellites are observable to the receiver and the inertial position when the sufficient number of GPS satellite are not available to the GPS receiver;

C. performing signal re-acquisition operations when the inertial position is used in the navigation information and one or more GPS satellites are again observable to the GPS receiver, the receiver performing the signal re-acquisition operations using the inertial position and associated covariance information and performing ambiguity re-resolution by the setting of ambiguity and associated covariance values of a GPS floating ambiguity filter to values based on the inertial position and associated covariance; and D. including the GPS position in the navigation information once the receiver has re-acquired the signals from the sufficient number of satellites.

15. A method of operating an inertial/global positioning system (GPS) receiver to provide uninterrupted navigation information, the method including the steps of:

A. determining a GPS position and a GPS time-tagged inertial position relative to the GPS position and updating a Kalman filter using inertial and GPS position information, the GPS time used for tagging a given inertial position being determined by setting the GPS time based on when the receiver receives a first byte of inertial measurement data from which given inertial position is determined;

B. using the GPS position in the navigation information when a sufficient number of GPS satellites are observable to the receiver and the inertial position when the sufficient number of GPS satellite are not available to the GPS receiver;

C. performing signal re-acquisition operations when the inertial position is used in the navigation information and one or more GPS satellites are again observable to the GPS receiver, the receiver performing the signal re-acquisition operations using the inertial position and associated covariance information; and D. including the GPS position in the navigation information once the receiver has re-acquired the signals from the sufficient number of satellites.

16. The method of claim 15 wherein the step of updating the Kalman filter includes including in a state error vector terms that correspond to an estimated measurement noise level and estimated accelerometer and gyroscope biases.

17. The method of claim 15 wherein the step of updating the Kalman filter includes performing a zero velocity update when the receiver is not moving.

18. The method of claim 17 wherein the step of performing a zero velocity update includes using associated velocity thresholds that are used to determine that the receiver is stationary as observational velocity data.

19. The method of claim 16 wherein the step of updating the Kalman filter includes using average specific forces for updating the Kalman filter when the receiver remains stationary after initialization of the Kalman filter.

20. The method of claim 16 wherein the step of updating the Kalman filter includes using an initial rotational matrix for updating the Kalman filter when the receiver remains stationary after initialization of the Kalman filter.

* * * * *